2,799,666

Patented July 16, 1957

2,799,666

LINEAR POLYCARBONATES FROM BIS(HY-DROXYETHOXY) AROMATIC COMPOUNDS

John R. Caldwell, Kingsport, Tenn., assignor to Eastman Kodak Company, Rochester, N. Y., a corporation of New Jersey No Drawing. Application January 26, 1956,
Serial No. 561,663

14 Claims. (Cl. 260—47)

This invention relates to highly polymeric linear polycarbonates prepared by the condensation of (1) one mole proportion of a 2,2'-arylenedioxydiethanol having the general structure

HO—CH₂—CH₂—O—X—O—CH₂—CH₂—OH wherein X represents an aromatic nucleus which is attached to the oxy atoms at nuclear para positions as further defined hereinbelow with (2) from about 1.5 to about 3 mole proportions of an alkyl carbonate containing from 3 to 20 carbon atoms in the presence of an ester interchange catalyst. This invention also relates to the process involved in preparing these polycarbonates and to the fibers, films and molding compositions prepared from these polycarbonates.

A copending application filed December 8, 1953, by D. D. Reynolds and John Van Den Berghe, Serial No. 397,040, discloses highly polymeric linear polycarbonates prepared by the self-condensation in the presence of an ester-interchange catalyst of a 4,4'-bis(β-hydroxyethoxy) biphenyl-bis-(alkyl or aryl carbonates) or substituted derivates thereof. The polycarbonates which can be prepared according to the process of the instant invention include those described in the Reynolds and Van Den Berghe application. Moreover, linear polycarbonates of aromatic character have also been described by Carothers and his followers including polycarbonates prepared from p-xylylene glycol condensed with an alkyl carbonate. According to Carothers, polycarbonates can be prepared by alcoholysis in the presence of an alkaline catalyst.

The superior character of the present invention is quite surprising in view of the fact that neither hydroquinone nor p-xylylene glycol react directly to form a highly polymeric linear polycarbonate by means of simply heating a mixture of the dihydroxy compound and an alkyl carbonate.

One of Carother's followers has suggested that a trace of an aliphatic dibasic acid can be introduced into the reactants whereby "super polycarbonates" can be produced.

Thus, the process described in U. S. Patent 2,210,817 employs equimolar amounts of glycol and dialkyl carbonate which are reacted in the presence of a catalyst such as an alkali metal and a non-volatile carboxylic acid under conditions which require the formation of an intermediate polymer which must be dissolved in an organic solvent and washed with water, dilute hydrochloric acid, and then more water, after which the organic solvent must be removed before the final polymerization which is accomplished by heating the intermediate product. It is obvious that this series of required operations adds greatly to the cost of the process and presents serious problems to be overcome in order to accomplish commercial production. In contrast to this, the inventor has discovered a process for obtaining a high molecular weight polycarbonate by merely heating a 2,2'-arylene-dioxydiethanol with an alkyl carbonate in the presence of a specific class of ester-interchange catalysts.

Apparently the discovery of the instant invention is predicated upon the peculiar structure of the 2,2'-arylenedioxydiethanols which permits the reaction to proceed in the presence of certain catalysts so as to produce a high molecular weight linear polycarbonate. There is nothing in the prior art which serves as a basis for predicting such a result. It is well-known that preparation of polycarbonates is complicated by many difficulties, hence the discovery of the instant invention is all the more unexpected.

It is an object of this invention to provide highly polymeric linear polycarbonates.

It is a further object of this invention to provide a process for preparing such linear polycarbonates by heating a 2,2'-arylenedioxydiethanol with an alkyl carbonate in the presence of an ester interchange catalyst.

It is a further object of this invention to provide an unexpectedly efficacious species of this process wherein the catalyst is a magnesium, calcium or strontium bimetallic complex with aluminum or titanium.

It is a further object of this invention to provide molding compositions, fibers and films from such highly polymeric linear polycarbonates which have excellent physical characteristics such as the percentage of elongation, tenacity, elastic recovery, work recovery, stress-relaxation, tensile strength, resistance of films to tearing and repeated folding, modulus of elasticity, electrical properties, light color, etc.

In accordance with an embodiment of this invention there is provided a process for preparing a highly polymeric linear polycarbonate which comprises condensing (1) a 2,2'-arylenedioxydiethanol having the following general formula:

HO—CH₂—CH₂—O—X—O—CH₂—CH₂—OH wherein X represents an aromatic nucleus containing from 6 to 20 carbon atoms which is connected to the oxygen atoms of the above general formula by para-positioned linkages directly attached to an aromatic nucleus, with (2) a lower alkyl carbonate, in the presence of an alkaline earth metal bimetallic lower alkoxide wherein the second metal is selected from the group consisting of aluminum and titanium.

The 2,2'-arylenedioxydiethanols defined by the general formula set forth above include a large variety of different compounds wherein X can be derived from an aromatic nucleus as illustrated by the following structural formulas:

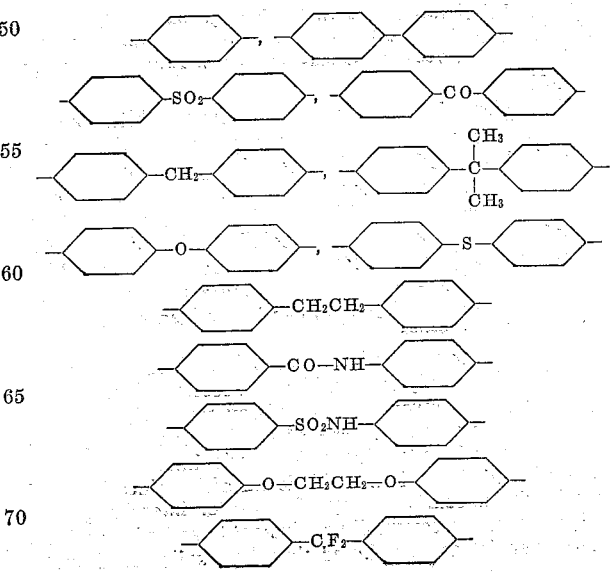

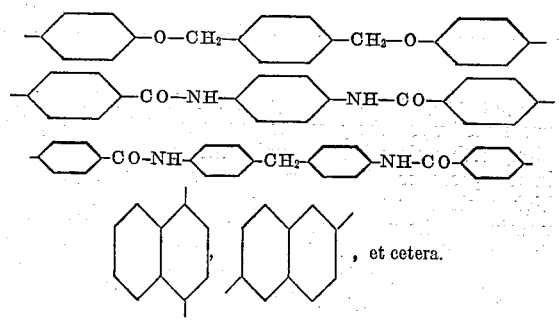

These compounds can be prepared by various processes such as from the corresponding phenols and ethylene oxide or ethylene chlorohydrin. For example, the 1,5-di-(β-hydroxyethyl) ether of naphthalene can be prepared from heating 1,5-naphthalene-diol under pressure at a temperature of from about 80° to about 140° C. and preferably at 100°–120° C. with from about 2 to about 3 mole proportions of the ethylene oxide per mole of 1,5-naphthalenediol (preferably from about 2.2 to about 2.4 mole proportions) in the presence of an alkali metal hydroxide employed in an amount of from about 0.1 to about 2.0% based on the weight of 1,5-naphthalenediol. This reaction is advantageously carried out in an autoclave in an inert solvent such as an alkanol, 1,4-dioxane, tetrahydrofuran, methoxyethyl alcohol, etc. The lower alkanols are generally to be preferred. Although ethylene oxide is to be employed in this illustrative process to produce a compound suitable for the preparation of a highly polymeric linear polycarbonate, it is apparent that the related homologs can be similarly prepared employing other alkylene oxides. Such homologs are not to be employed in accordance with this invention but can be used in preparing polyesters, alkyd resins, polyurethanes, etc.

The following example will serve to illustrate the preparation of one of the 2,2'-arylenedioxydiethanols employed in the instant invention.

*Example 1.—Preparation of the 1,5-di-(β-hydroxyethyl) ether of naphthalene*

Ninety-five grams of 1,5-naphthalenediol, 200 cc. methyl alcohol, 57 g. ethylene oxide, and 1.0 g. potassium hydroxide were placed in an autoclave and stirred at 120° for 4 hours. The product was filtered and the crystals dissolved in 1 liter of hot dioxane and poured with stirring into 2 liters of 0.25 percent aqueous sodium hydroxide solution to remove unreacted 1,5-naphthalenediol. The product was filtered, washed with cold water, and dried. The crystals were recrystallized from a mixture of methoxyethyl alcohol and water. A yield of 85 percent of the 1,5-di(β-hydroxyethyl)ether of naphthalene was obtained: melting point 181° C.; carbon found 67.8%, calculated 67.7%; hydrogen found 6.34%, calculated 6.45%.

Examples of various alkyl carbonates which can be employed in accordance with the process of this invention include diethyl carbonate, dipropyl carbonate, di-butyl carbonate, di-n-hexyl carbonate, ethylene carbonate, propylene carbonate, di-isopropyl carbonate, ditertiary-butyl carbonate, etc. It is especially preferred to employ di-n-butyl carbonate because it boils at temperature high enough to give a satisfactory reaction rate, and at the same time, the butyl alcohol can be distilled readily from the reaction mixture.

Although any of the known ester-interchange type polyesterification catalysts would be supposed to effectuate the process of this invention, it has been found that the employment of a specific type of catalyst produces the especially worthwhile highly polymeric linear polycarbonates of this invention. This is surprising since it would ordinarily appear that any of the ester interchange catalysts would be essentially equivalent to any of the others. However, it has been found that the alkaline earth metal bimetallic complexes described in U. S. Patents 2,720,502 and 2,720,506 produce especially advantageous results. These catalysts have the following general formulas:

$$M(Al(OR)_4)_2$$
$$M(HTi(OR)_6)_2$$
$$M(Ti(OR)_6)$$

wherein M is an alkaline earth metal such as magnesium, calcium or strontium and R is an alkyl radical containing from 1 to 6 carbon atoms.

Examples of catalysts which can be employed are magnesium aluminum tetrabutoxide, calcium aluminum tetraethoxide, strontium titanium hexapropoxide, magnesium hydrogen titanium hexaethoxide, etc.

The catalysts are advantageously employed in an amount of from about 0.005% up to about 0.02% and preferably from 0.006% to 0.01% based on the total weight of the reactants being employed. Higher and lower percentages can also be employed.

The first stage of the condensation reaction is carried out by heating the reactants in a vessel equipped with a distillation column whereby the alcohol corresponding to the alkyl carbonate is removed from the reaction mixture by an ester interchange reaction. After this first stage of the reaction is essentially complete, it is advantageous to then increase the temperature to about 200° C. or higher (advantageously from about 200° to about 270° C.) and then stir the reaction mixture under greatly reduced pressure in order to allow the volatile reaction products to escape from the viscous melt. These details are essentially equivalent to the analogous details of carrying out the condensation of glycols and any of the bifunctional carboxylic acid esters in preparing highly polymeric linear polyesters and it is therefore not necessary to indulge in a lengthy description of the process for the preparation of the novel polycarbonates of this invention.

This invention can be further illustrated by the following examples of preferred embodiments although it will be understood that these examples are included merely for purposes of illustration and are not intended to limit the scope of the invention unless otherwise specifically indicated.

*Example 2.—Polycarbonate from*

One hundred and ninety-eight grams (1.0 mole) of 2,2'-(p-phenylenedioxy)diethanol and 348 g. (2.0 moles) of di-n-butyl carbonate were placed in a reaction vessel equipped with a stirrer, a distillation column, and an inlet for purified nitrogen. A solution of 0.02 g. magnesium titanium butoxide in 1 cc. of butyl alcohol was added as catalyst and the mixture was stirred at 180–200° C. in an atmosphere of nitrogen. Butyl alcohol was distilled from the reaction mixture as the ester interchange took place. The temperature was then raised to 240° C. and held for 1 hour. A vacuum of 0.1 mm. was applied and stirring was continued for 4 hours. A clear, highly viscous melt was obtained.

The product had an inherent viscosity of 0.61 when measured in a solution of 60% phenol–40% tetrachloroethane. It melted at 144–147° C. and was soluble in tetrachloroethane, butyrolactone, and sulfolane. It gave strong, elastic fibers when extruded through a spinneret. The polycarbonate was molded readily by standard methods in an injection molding press and the molded objects obtained showed excellent dimensional stability. The polycarbonate was also useful as an insulating covering for electric wire. Films made from the polycarbonate were valuable as protective wrappings.

*Example 3.—Polycarbonate from*

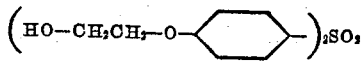

Three hundred and six grams (1.0 mole) of 2,2'-(sulfonyl-bis(p-phenyleneoxy)) diethanol and 348 g. (2.0 moles) of dibutyl carbonate were placed in a reaction vessel as described in Example 2. A solution of 0.08 g. magnesium titanium butoxide in 2 cc. of butyl alcohol was added as catalyst, and the mixture was stirred at 180–220° C. in a stream of pure nitrogen. Butyl alcohol was removed through the column. The temperature was then raised to 220° C. and held for 1 hour. A vacuum of 0.1 mm. was applied and stirring was continued for 5 hours to give a highly viscous melt.

The product has an inherent viscosity in 60% phenol–40% tetrachloroethane of 0.55. It melted at 145–155° C. Strong, elastic fibers were obtained by melt spinning the polycarbonate. The polycarbonate was particularly useful as a molding plastic and as a wire insulator. It also was useful as a photographic film base for both black and white and color types of silver halide photographic emulsions.

*Example 4.—Polycarbonate from*

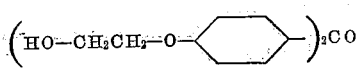

Using the general procedure outlined in Example 2 the polycarbonate of 2,2'-(oxobis(p-phenyleneoxy)) diethanol was prepared. It melted at 150–160° C. This polycarbonate was valuable as a molding plastic, a protective wrapping material, and covering for wire. It was also useful as a photographic film base.

*Example 5.—Polycarbonate from*

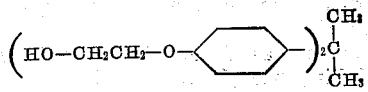

The polycarbonate from 2,2'-(isopropylidene-bis(p-phenyleneoxy)) diethanol was made by the general procedure described above. Calcium aluminum butoxide was employed as the catalyst. The polycarbonate melted at 120–130° C. This polycarbonate is of particular value as an ingredient of lacquers and varnishes because of its solubility properties.

*Example 6.—Polycarbonate from*

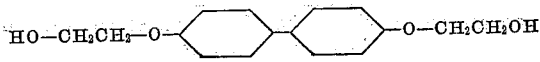

The polycarbonate of 2,2'-(p,p'-biphenylenedioxy) diethanol was made as described above. Strontium aluminum ethoxide was employed as the catalyst. The polycarbonate melted at 170–180° C. and was of particular value as a photographic film base and a molding plastic.

*Example 7.—Polycarbonate from*

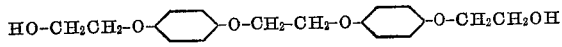

The polycarbonate of 2,2'-(ethylenedioxybis (p-phenyleneoxy))diethanol was made as described above. It was useful as an ingredient of paints, lacquers, and other protective coatings.

*Example 8.—Polycarbonate from*

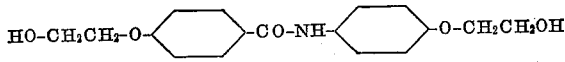

The polycarbonate of p,p'-bis(2-hydroxyethoxy) benzanilide was made as described above. It was valuable for the production of fibers, films, and molded plastics.

*Example 9.—Polycarbonate from the 1,5-di-(β-hydroxyethyl)ether of naphthalene*

A high molecular weight crystalline polymer was prepared using the procedure outlined in Example 2 employing n-butyl carbonate and the same catalyst. This polycarbonate melted in the range of about 210° C. and was useful in the preparation of fibers, films and for molding shaped objects.

The unusual characteristics of the polycarbonate of Example 9 is especially surprising in view of the fact that the polycarbonate of a closely related compound, namely, 1,4-bis(2-hydroxyethoxy) benzene melts at only 145° C. It would ordinarily be supposed that the polycarbonate from the naphthalene compound of Example 9 would represent no improvement whereas it was indeed most unexpected to find that the greatly improved product melting at 210° was obtained. This is an unusually high melting point for a polymer which contains ether linkages.

Other polycarbonates can be prepared in accordance with this invention employing any of the other 2,2'-arylenedioxydiethanols. Similarly, any of the other alkyl carbonates can be employed in the processes of preparation. Moreover, aryl carbonates are also operative but are not generally preferred since the alkyl carbonates are more advantageously employed. Any of the catalysts covered by the above general formulas can also be employed.

According to an embodiment of this invention, there is provided a novel class of polycarbonates produced in accordance with this invention which contain recurring units or groups having the following general formula:

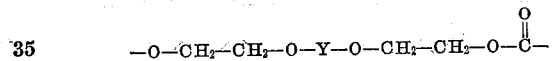

wherein Y has been illustrated above.

The unusual nature of this invention is further emphasized by the fact that self condensation of compounds having the following formula have also been tried, but without success, as discussed in the copending application of Reynolds et al. referred to hereinabove:

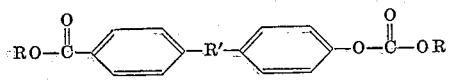

wherein R is a lower alkyl radical and R' represents a radical such as —SO₂— or —CO— or the like.

When each R is ethyl and R' is —SO₂—, the product employed Ti(OC₄H₉)₄ as the catalyst was a brown, glassy, noncrystalline, brittle material which was not considered satisfactory for fibers, film, molding compositions, etc. It appeared that some decomposition had occurred.

When each R is ethyl and R' is —CO—, the product employed either Ti(OC₄H₉)₄ or LiAl(OC₂H₅) as the catalyst was a dark, non-crystalline mass which melted only upon heating to about 300° C. with considerable darkening which appeared to be due to some decomposition phenomena.

Although the invention has been described in considerable detail with reference to certain preferred embodiments thereof, it will be understood that variations and modifications can be effected without departing from the spirit and scope of the invention as described hereinabove and as defined in the appended claims.

I claim:

1. A highly polymeric linear polycarbonate containing recurring groups having the following general formula:

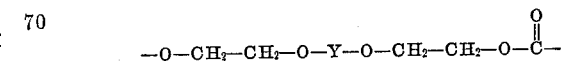

wherein Y represents an aromatic nucleus which is connected to the oxygen atoms in the above general formula by para linkages directly attached to an aromatic nucleus and which is selected from the group consisting of the following radicals:

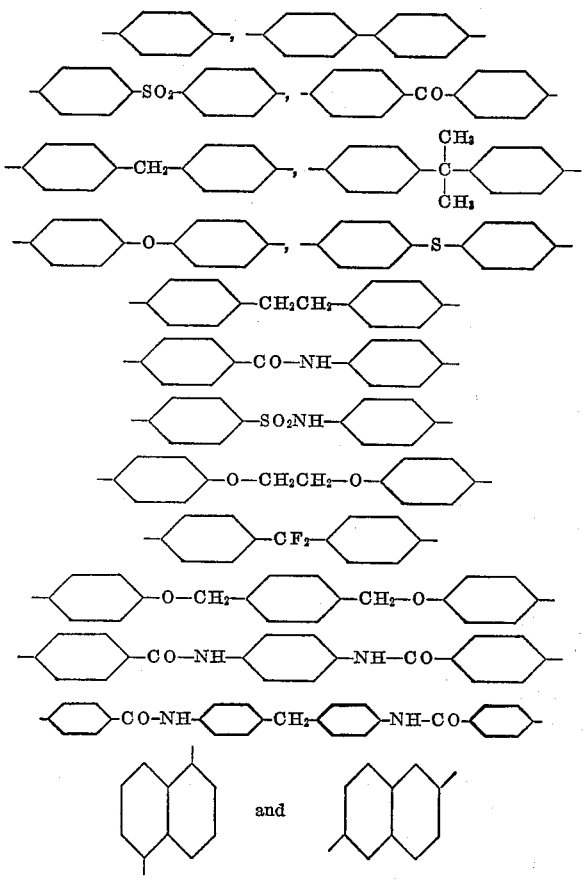

2. A highly polymeric linear polycarbonate containing recurring units having the following formula:

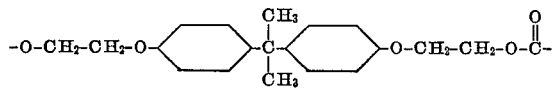

3. A highly polymeric linear polycarbonate containing recurring units having the following formula:

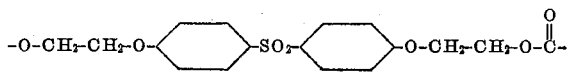

4. A highly polymeric linear polycarbonate containing recurring units having the following formula:

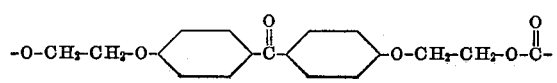

5. A highly polymeric linear polycarbonate containing recurring units having the following formula:

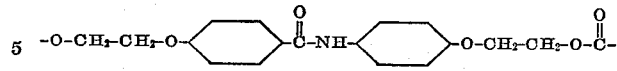

6. A highly polymeric linear polycarbonate containing recurring units having the following formula:

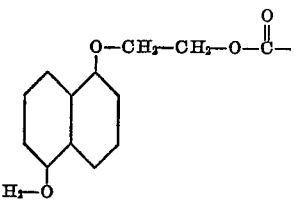

7. A process for preparing a highly polymeric linear polycarbonate which comprises condensing in the presence of a catalyst selected from the group of those having the following general formulas:

$$M(Al(OR)_4)_2, M(TiH(OR)_6)_2 \text{ and } M(Ti(OR)_6)$$

wherein M represents an alkaline earth metal and R represents a lower alkyl radical, (1) a 2,2'-arylene-dioxy-diethanol having the following general formula:

wherein X represents an aromatic nucleus containing from 6 to 20 carbon atoms which is connected to the oxygen atoms of the general formula by para linkages which are directly connected to a benzene ring, with (2) a lower alkyl carbonate at an elevated temperature under an inert atmosphere with agitation.

8. A process as described in claim 7 wherein 2,2'-(p-phenylenedioxy) diethanol is condensed with di-n-butyl carbonate in the presence of magnesium titanium butoxide.

9. A process as defined in claim 7 wherein 2,2'-(sulfonyl bis(p-phenyleneoxy)) diethanol is condensed with di-n-butyl carbonate in the presence of magnesium titanium butoxide.

10. A process as defined in claim 7 wherein 2,2'-(oxobis(p-phenyleneoxy))diethanol is condensed with di-n-butyl carbonate in the presence of magnesium titanium butoxide.

11. A process as defined in claim 7 wherein 2,2'-(isopropylidene bis(p-phenyleneoxy)) diethanol is condensed with di-n-butyl carbonate in the presence of magnesium titanium butoxide.

12. A process as defined in claim 7 wherein 2,2'-(1,5-naphthalenedioxy) diethanol is condensed with di-n-butyl carbonate in the presence of magnesium titanium butoxide.

13. A film prepared from a polycarbonate defined by claim 1.

14. A fiber prepared from a polycarbonate defined by claim 1.

No references cited.